United States Patent [19]

Hoki et al.

[11] 4,327,193

[45] Apr. 27, 1982

[54] FOAMING SYNTHETIC RESIN COMPOSITIONS STABILIZED WITH CERTAIN HIGHER ETHERS, ESTERS OR ANHYDRIDES

[75] Inventors: Tsuneo Hoki; Yutaka Matsuki, both of Suzuka, Japan

[73] Assignee: Asahi-Dow Limited, Tokyo, Japan

[21] Appl. No.: 241,336

[22] Filed: Mar. 6, 1981

[30] Foreign Application Priority Data

Mar. 10, 1980 [JP] Japan ................................. 55-29100

[51] Int. Cl.³ ............................................. C08J 9/14
[52] U.S. Cl. ........................................ 521/88; 521/89; 521/97; 521/143; 521/144; 521/149
[58] Field of Search .................... 521/88, 89, 97, 143, 521/144

[56] References Cited

U.S. PATENT DOCUMENTS

| | | | |
|---|---|---|---|
| 2,628,945 | 2/1953 | Wayne | 521/97 |
| 3,470,113 | 9/1969 | Boxmann et al. | 521/89 |
| 3,644,230 | 2/1972 | Cronin | 264/53 |
| 3,755,208 | 8/1973 | Ehrenfreund | 264/53 |
| 4,214,054 | 7/1980 | Watanabe et al. | 521/95 |
| 4,217,319 | 8/1980 | Komori | 264/53 |
| 4,263,165 | 4/1981 | Roos et al. | 521/89 |
| 4,264,469 | 4/1981 | Yamaguchi et al. | 521/98 |
| 4,275,168 | 6/1981 | Watanabe et al. | 521/91 |
| 4,276,247 | 6/1981 | Muenchow et al. | 521/89 |

*Primary Examiner*—Morton Foelak

[57] ABSTRACT

Substantially closed-cell aliphatic olefin polymer foams having improved dimensional stability are provided by the inclusion therein of from 0.1 to 10 weight percent, based upon the olefin polymer, of certain higher aliphatic hydrocarbyl ether, ester or anhydride compounds.

7 Claims, 2 Drawing Figures

FOAMING SYNTHETIC RESIN COMPOSITIONS STABILIZED WITH CERTAIN HIGHER ETHERS, ESTERS OR ANHYDRIDES

BACKGROUND OF THE INVENTION

The present invention relates generally to the foaming or expansion of a synthetic resin composition and, more particularly, to foaming processes, foamable compositions and foamed articles involving an aliphatic olefin polymer, a blowing agent and 0.1 to 10 percent by weight, based on said aliphatic olefin polymer, of at least one compound which is effective to suppress the escape of the blowing agent gas from the expanded foam, with a resultant improvement in the gas efficiency of the blowing agent together with a substantial reduction in shrinkage of the expanded foam.

Generally, it is known to produce thermoplastic synthetic resin foam by adding a blowing agent to the resin and then heating the resultant resin mixture to gasify the blowing agent for expanding the resin. Improvement in the efficiency of such blowing agents is significant for commercial-scale production of foams.

Among thermoplastic resins, aliphatic olefin polymers are particularly difficult to expand directly in a commercial-scale process. This has been attributed to the high degree of temperature dependence of their thermo-rheological viscoelasticity in the molten state and the high blowing agent gas permeability of their foam cell membranes. Further complications arise from the latent heats of thermal expansion and crystallization which may occur during the foaming of such aliphatic olefin polymers. Commonly, and especially for expansion ratios of five or more, aliphatic olefin polymers are modified prior to expansion, by crosslinking or by blending with other resin or resins.

As an alternative approach, Japanese Patent Publication No. 35(1960)-4,341 discloses extrusion-foaming of a non-crosslinked polyolefin resin using such a relatively expansive blowing agent as 1,2-dichlorotetrafluoroethane. However, the resulting foam product often undergoes a gradual shrinkage and a density change and has a poor surface appearance with many wrinkles. Improved quality and dimensional control of the foams produced by such process are therefore desirable.

More recently, a variety of chemical additives have been discovered which improve the quality and dimensional stability of olefin polymer foams without the necessity of crosslinking and/or resin blending techniques while permitting the satisfactory utilization of less expensive volatile organic blowing agents in place of 1,2-dichlorotetrafluoroethane. More specifically, such additives include saturated higher fatty acid amides, saturated higher fatty acid amines and complete esters of saturated fatty acids as disclosed in Watanabe et al. U.S. Pat. No. 4,214,054; partial esters of long chain fatty acids as disclosed in Cronin U.S. Pat. No. 3,644,230 and in Ehrenfreund U.S. Pat. No. 3,755,208; partial and complete esters of aliphatic fatty acids as disclosed in Komori U.S. Pat. No. 4,217,319; and the related technology of Japanese Kokai 53-102,917, 54-34,374 and 54-39,476.

The present invention provides another group of chemical additives which improve the dimensional stability of aliphatic olefin polymer foams. More specifically, the invention provides an olefin polymer composition comprising normally solid aliphatic olefin polymer which is easily expanded using commonly available inexpensive blowing agents to give a foam product exhibiting reduced shrinkage and improved dimensional stability and surface smoothness.

SUMMARY OF THE INVENTION

In accordance with the present invention such a foamable olefin polymer composition comprises a major proportion by weight of a normally solid aliphatic olefin polymer, a volatile organic blowing agent and from 0.1 to 10 weight percent, based upon such olefin polymer of a compound of the formula I:

$$R_1\text{—}X\text{—}R_2 \qquad (I)$$

wherein $R_1$ and $R_2$ represent an aliphatic hydrocarbon group having 3–24 carbon atoms, respectively, with at least one thereof having not less than 10 carbon atoms, and X represents a radical selected from the group consisting of

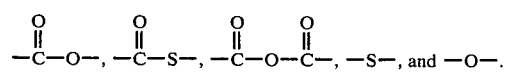

$$-\overset{\text{O}}{\underset{\|}{\text{C}}}-\text{O}-,\ -\overset{\text{O}}{\underset{\|}{\text{C}}}-\text{S}-,\ -\overset{\text{O}}{\underset{\|}{\text{C}}}-\text{O}-\overset{\text{O}}{\underset{\|}{\text{C}}}-,\ -\text{S}-,\ \text{and}\ -\text{O}-.$$

The foamable aliphatic olefin polymer compositions of the present invention are particularly advantageous in the sense that, even when non-crosslinked olefin polymers and readily available relatively inexpensive volatile organic blowing agents are employed, good quality foam products having improved dimensional stability are still obtained. The availability of this different type of stabilizer additive provides greater operating flexibility to foam manufacturing operations.

DETAILED DESCRIPTION OF THE INVENTION

Figure 1:
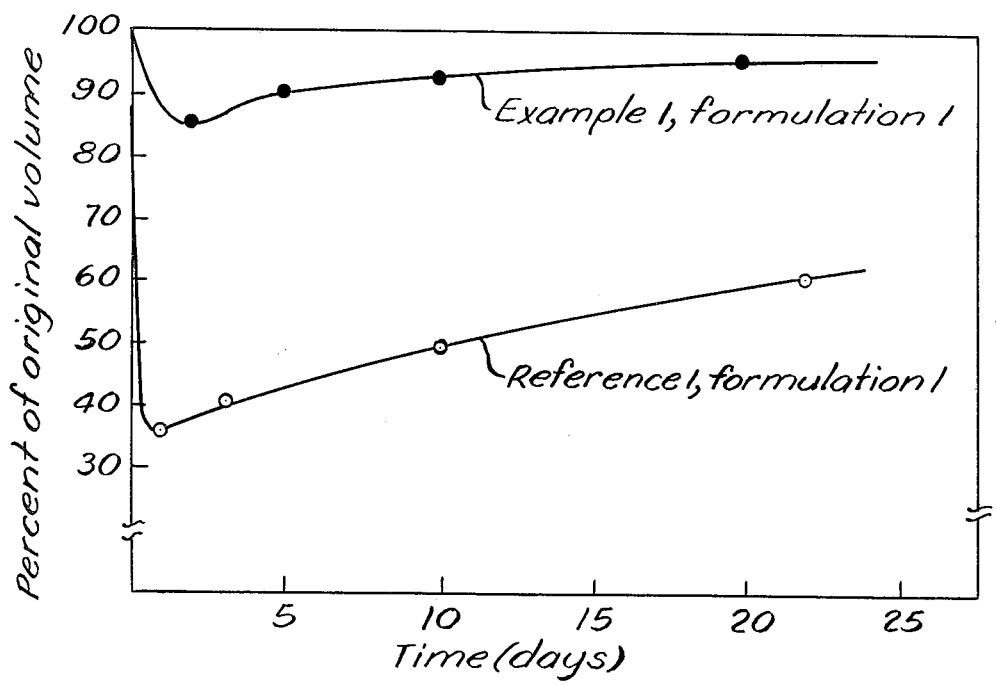
FIG. 1 is a graph showing foam volume in percent based upon initial foam volume as a function of time for foam formed from Formulation 1 in Example 1 and from Formulation 1 in Reference 1 of the accompanying working examples.

Suitable stabilizers for use herein are compounds of the formula I:

$$R_1\text{—}X\text{—}R_2 \qquad (I)$$

wherein $R_1$ and $R_2$ each represent an aliphatic hydrocarbon group having 3 to 24 carbon atoms, and at least one thereof must have 10 or more carbon atoms. Typical examples of the compounds providing such hydrocarbon groups are: butyric acid, isobutyric acid, caproic acid, caprilic acid, capric acid, undecanoic acid, lauric acid, myristic acid, palmitic acid, stearic acid, oleic acid, arachic acid, behenic acid and erucic acid, including alcohols obtained by reducing these acids by a well-known method, acid anhydrides obtained by dehydration of thiols, as well as esters, thioesters, ethers and thioethers.

These compounds may be mixtures of fatty acids produced from natural fats and oils, derivatives thereof. Also, a part of the compounds may be substituted by a compound or compounds containing unsaturated aliphatic hydrocarbon group or groups.

As described previously, at least one of $R_1$ and $R_2$ must be an aliphatic hydrocarbon group having 10 or more carbon atoms. If both $R_1$ and $R_2$ have 9 or less carbon atoms, the beneficial results of the present invention are not obtained, perhaps because such compounds do not provide a necessary combination of cohesiveness to, and solubility in, the aliphatic olefin polymers employed herein.

Typical examples of the compounds represented by the foregoing formula I, above, are: undecanoic anhydride, lauric anhydride, myristic anhydride, palmitic anhydride, stearic anhydride, behenic anhydride, caproundecanoic anhydride, caprostearic anhydride, stearooleic anhydride, behenoerucic anhydride; diundecyl ether, dimyristyl ether, dipalmityl ether, distearyl ether, capryl searyl ether, and the like ethers as well as thioethers corresponding to these ethers; and decane undacanoate, undecane laurate, dodecane myristate, stearyl stearate, stearyl oleate, stearyl behenate, docosane erucate, and the like esters as well as thioesters corresponding to these esters.

According to the present invention, the foamable resin composition should contain at least 0.1 percent by weight, based on the aliphatic olefin polymer, of at least one compound represented by the formula I, with the total content thereof falling in the range of 0.1 to 10 percent by weight, when two or more such compounds are used. The amount of added formula I compound or compounds may be selected within this range, depending on the types of polymer and blowing agent used as well as on the shape, physical and mechanical properties of the intended foam. Generally, it is preferable that the total amount be in the range of 0.3 to 7 percent by weight. If the content of formula I compound is smaller than 0.1 percent by weight, the resultant foam will have significantly inferior properties. On the other hand, using more than 10 percent by weight generally gives no further improvement and may show an undesirable plasticizing action.

The aliphatic olefin polymers herein referred to are normally solid polymers predominantly composed of olefins, including low-density polyethylene, medium-density polyethylene, high-density polyethylene, isotactic polypropylene and poly-1-butene and such copolymers of ethylene or propylene and other monomers copolymerizable therewith as propylene-(1-octene)-ethylene copolymer, ethylene-propylene copolymer, ethylene-vinyl acetate copolymer, ethylene-acrylic acid copolymer, ethylene-ethyl acrylate copolymer and ethylene-vinyl chloride copolymer, as well as zinc, sodium, calcium and magnesium salts of ethylene-acrylic acid copolymer. These polyolefin resins may be used individually or as mixtures of two or more.

For mixing the formula I compounds of the present invention with the aliphatic olefin polymer to be employed, such components may be admixed and kneaded by any suitable conventional means such as single-screw extruder, twin-screw extruder, compounding rolls, and Banbury mixer. In any case, a preliminary blend of the formula I compound and the olefin polymer may be prepared as a dryblend or masterbatch, or the formula I compound may be mixed with the olefin polymer in molten or heat plastified form just before expansion.

The foamable olefin polymer composition of the present invention may be expanded into a foam by conventional methods. For example, conventional extrusion foaming techniques can be employed in which an admixture of the olefin polymer and the formula I compound of the present invention is heated and/or worked to be melted or heat plastified, and a volatile organic blowing agent is added thereto at an elevated temperature under high pressure. Then, the resultant molten or heat plastified mixture is extruded into a lower-pressure zone to be expanded into a foam. Alternatively, a batch method may be used in which the volatile organic blowing agent is added at elevated temperature under high pressure to the molten olefin polymer composition and then pressure is removed from the molten mixture system. Also, the olefin polymer/formula I compound can be crosslinked with electron beams or a chemical crosslinking agent if desired before expansion. However, the present invention is particularly effective when applied to extrusion-expansion of olefin polymer compositions and especially when such compositions are to be expanded to five or more times their original, unexpanded volume.

Any conventional volatile organic blowing agents may be used as desired. However, especially preferable for the present invention are such volatile organic blowing agents that have boiling points lower than the melting point of the aliphatic olefin polymer employed. Typical examples of such preferable blowing agents include propane, butane, pentane, pentene, hexane, hexene, heptane and octane. Also usable as the blowing agents are such halogenated hydrocarbons meeting the foregoing limitation on the boiling points as methylene chloride, trichlorofluoromethane, dichlorofluoromethane, chlorodifluoromethane, chlorotrifluoromethane, dichlorodifluoromethane, 1,1-dichloroethane, 1-chloro-1,1-difluoroethane, 1,8-dichlorotetrafluoroethane, chloropentafluoroethane and the like, including mixtures thereof. In addition to such volatile organic blowing agents, known chemical blowing agents such as azodicarbonamide, azobisisobutyronitrile, dinitrosopentamethylenetetramine, p-toluenesulfonyl hydrazide and the like can also be optionally employed in conjunction with such volatile organic blowing agents.

The expandable or foamable olefin polymer composition according to the present invention may contain minor amounts of lubricating and nucleating agents such as zinc stearate or similar metal soaps and finely-ground calcium silicate or the like inorganic materials. Also, the resin composition of the present invention may contain an ultraviolet light absorber, antistatic agent, stabilizer, colorant and/or lubricating agent other than the foregoing in a total amount not exceeding 5 percent by weight.

The foamable aliphatic olefin polymer composition according to the present invention may be expanded into almost any shapes including sheets, blocks, rods and pipes, or it may be used for electric wire and cable coverings or sheathings or as a variety of other foamed articles.

The present invention is further illustrated by the following examples and the accompanying comparative (or reference) experiments. The resulting foam products were evaluated in terms of the post-expansion shrinkage (i.e., shrinkage as a function of time after expansion) and the surface condition of foams after stabilization of their dimensions. All parts and percentages are given on a weight basis unless otherwise specified.

Post-expansion shrinkage (in percent of initial expanded volume) was determined using round foam rod test specimens (about 25 mm across and 50 cm long) obtained by extrusion foaming of the indicated olefin polymer compositions. Immediately after expansion and n days thereafter, the diameter and length of each specimen were measured with a vernier caliper (JIS grade 1) and steel rule (JIS grade 1) to determine its volume. The post-expansion shrinkage thereof was then determined in accordance with the formula:

$$\text{Shrinkage } n \text{ days after expansion} = \left(1 - \frac{\text{Volume of foam } n \text{ days after expansion}}{\text{Volume of foam immediately after expansion}}\right) \times 100$$

The surface condition of the various test specimens was evaluated in accordance with the following three relative ranks:

| Evaluation Symbols | Surface Conditions |
| --- | --- |
| G = Good | Surface having excellent smoothness almost without wrinkles |
| F = Fair | Surface having visible wrinkles, but commercially acceptable in general |
| P = Poor | Surface having many wrinkles significantly degrading the commercial value of the foam |

In industrial practice, it is preferable that the post-expansion shrinkage of a foam is minimized. Generally the initial shrinkage (shrinkage in one day after expansion) should be about 15 percent or less. If the initial shrinkage exceeds this level, a much longer time (about one month) is required for the foam to substantially recover its original dimensions and the foam will generally have an unacceptable surface condition. Further, it is desired, that the difference between the initial shrinkage and the shrinkage measured 10 days after expansion be not more than about 10 percent. If the difference in shrinkage exceeds this level, the resultant foam products will normally show an undesirably large variation in their dimensions.

EXAMPLE 1 AND REFERENCE EXPERIMENT 1

Base resin: Ethylene-vinyl acetate copolymer (containing 10% of vinyl acetate, with density of 0.93 g/cm$^3$ and MI of 1.5; EVATATE ® D-2021 produced by Sumitomo Chemical Co., Ltd.) . . . 100 parts
Nucleators: Calcium stearate . . . 0.1 part Calcium silicate . . . 0.6 part.

The foregoing resin and nucleators were fed, together with each additive shown in Table 1, into a single-screw extruder of 40 mm inside barrel diameter provided with a die having a round aperture 5 mm in diameter. The resultant resin composition was melted and kneaded therein with the volatile blowing agent (also shown in Table 1) being fed separately thereto, and the resultant molten mixture was extruded through the die into the atmosphere to be expanded into a foam.

In Table 1, the additives A, B, C, D and E are behenic anhydride, distearyl ether, distearyl thioether, stearyl laurate and stearyl thiolaurate, respectively. As the blowing agents I and II, dichlorodifluoromethane and 1,2-dichlorotetrafluoroethane, respectively, were used.

In the formulations of Reference 1, the same procedure and conditions as those used in Example 1 were repeated except that either no additive was used or additives A', A", C' or D' were employed in place of additives A, B, C, D and E; additives A', A", C' and D' being ethyl stearate, stearyl propionate, stearyl methyl ether and nonane caprinate, respectively.

Experimental results for the Example 1 and Reference 1 formulations are summarized in Table 1.

In all experiments of Reference 1, the resultant foams showed a considerable post-expansion shrinkage much of which remained even after they were left to stand over a long period of time. Also, they had an inferior quality with their surfaces replete with wrinkles and irregularities.

Figure 2:
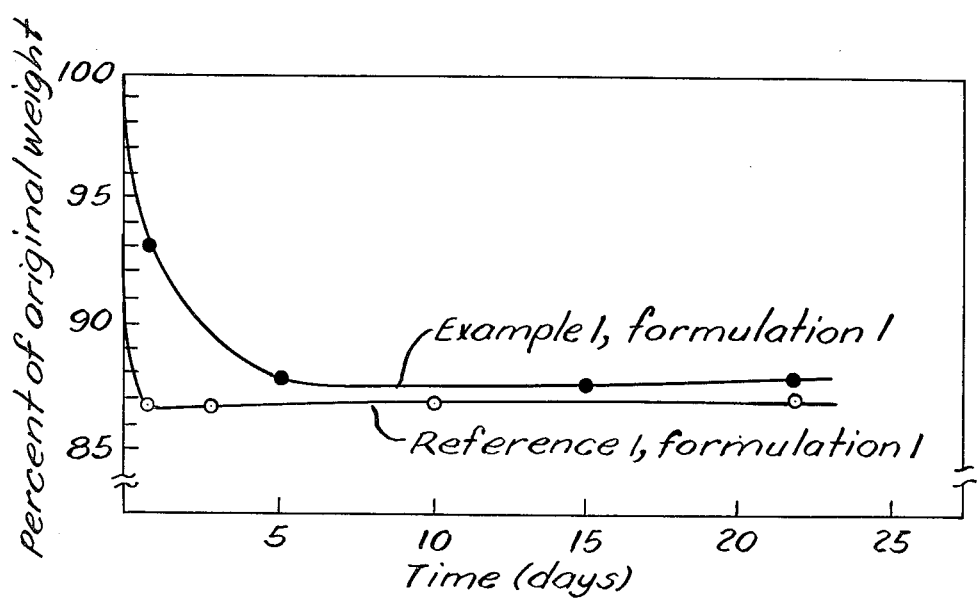
FIG. 2 is a graph showing foam weight in percent based upon initial foam weight as a function of time for foam formed from the same Formulations.

FIGS. 1 and 2 show changes in the volume and weight of the foam specimens of formulation 1 in Example 1 and of formulation 1 in Reference 1 as a function of time after expansion. As can be clearly seen from FIG. 1, foams having a very little volumetric change with time can be produced by extruding the resin compositions according to the present invention. Also, as evident from FIG. 2 showing the changes in the weight of the formulation 1 foam specimen of Example 1 and of Reference 1 as a function of time, the formulation 1 foam of Example 1 exhibits less loss of weight as a function of time than does the formulation 1 foam of Reference 1 implying that transmission of the foaming agent gas through cell walls is substantially reduced in the foams expanded from the resin compositions according to the present invention. Further, the indicated reductions in volumetric and weight changes as a result of reduced gas transmission through the cell walls, contributes to an improvement in the surface appearance of the resultant foams.

TABLE 1

|  |  | Additive (Wt. Parts) | Blowing Agent (Wt. Parts) | Foam Density (g/cm$^3$) | Shrinkage of Foam (Vol. %) | | State of dimensionally stabilized foam (30 days after expansion) |
| --- | --- | --- | --- | --- | --- | --- | --- |
|  |  |  |  |  | Max. | 10 Days After Expansion |  |
| Example 1 |  |  |  |  |  |  |  |
| Formulation | 1 | A 2.0 | I 21 | 0.035 | 14.7 | 7.5 | G |
|  | 2 | A 0.5 | II 28 | 0.034 | 12.9 | 8.0 | G |
|  | 3 | B 2.0 | I 21 | 0.033 | 15.3 | 7.5 | F |
|  | 4 | B 0.5 | II 28 | 0.034 | 12.8 | 10.3 | G |
|  | 5 | C 2.0 | I 21 | 0.033 | 16.5 | 12.5 | F |
|  | 6 | D 2.0 | I 21 | 0.033 | 14.5 | 10.6 | G |
|  | 7 | E 2.0 | I 21 | 0.035 | 15.0 | 12.0 | F |
| Reference 1 |  |  |  |  |  |  |  |
| Formulation | 1* | None | I 21 | 0.040 | 64.6 | 51.2 | P |
|  | 2* | None | II 28 | 0.030 | 33.4 | 25.7 | P |
|  | 3* | A' 2.0 | I 21 | 0.037 | 51.5 | 40.0 | P |
|  | 4* | A" 2.0 | I 21 | 0.036 | 50.0 | 35.1 | P |
|  | 5* | C' 2.0 | I 21 | 0.038 | 60.5 | 45.5 | P |

TABLE 1-continued

|  | Additive (Wt. Parts) | Blowing Agent (Wt. Parts) | Foam Density (g/cm³) | Shrinkage of Foam (Vol. %) | | State of dimensionally stabilized foam (30 days after expansion) |
|---|---|---|---|---|---|---|
|  |  |  |  | Max. | 10 Days After Expansion |  |
| 6* | D' 2.0 | I 21 | 0.037 | 50.0 | 40.2 | P |

*Not an example of the invention.

EXAMPLE 2 AND REFERENCE EXPERIMENT 2

Example 1 and Reference 1 were repeated except that 100 parts of polyethylene (with density of 0.919 g/cm³ and MI of 2.0; F-1920 ® produced by Ashai-Dow Limited) was used as the base resin in place of the ethylene-vinyl acetate copolymer of Example 1 and Reference 1 and except that the nucleator contents, namely the calcium stearate and calcium silicate contents, were changed to 0.06 part and 0.36 part, respectively. The experimental results are summarized in Table 2, in which blowing agents I and III are dichlorodifluoromethane and butane.

kPa) was blown over the beads to give secondary expanded beads which had a density of 25 kg/m³.

The resultant secondary expanded beads, as pressurized by compressed air of 1.5 kg/cm²G (147 kPa), were charged in a mold of a press molding machine (Model ECHO-120 manufactured by Toyo Machinery & Metal Co., Ltd.), and the mold was heated by steam of 1.2 kg/cm² (118 kPa) to obtain a molded article. The molded article had a density of 31 kg/m³ and showed good fusion between the beads.

The water absorption ratio of the resulting molded foam article was then determined by accurately measuring the volume (V) and weight ($W_o$) of a 100 mm × 100

TABLE 2

|  |  | Additive (Wt. Parts) | Blowing Agent (Wt. Parts) | Foam Density (g/cm³) | Shrinkage of Foam (Vol. %) | | State of dimensionally stabilized foam (30 days after expansion) |
|---|---|---|---|---|---|---|---|
|  |  |  |  |  | 1 Day After Expansion | 10 Days After Expansion |  |
| Example 2 |  |  |  |  |  |  |  |
| Formulation | 1 | A 1.0 | I 20 | 0.031 | 12.4 | 12.3 | G |
|  | 2 | A 2.0 | III 20 | 0.031 | 14.8 | 15.5 | G |
|  | 3 | B 2.0 | I 20 | 0.030 | 12.3 | 12.2 | G |
|  | 4 | B 2.0 | III 20 | 0.031 | 14.7 | 15.4 | G |
|  | 5 | C 2.0 | I 20 | 0.030 | 12.3 | 12.1 | F |
|  | 6 | D 2.0 | I 20 | 0.031 | 12.4 | 12.2 | F |
|  | 7 | E 2.0 | I 20 | 0.033 | 11.0 | 11.5 | F |
|  | 8 | A 0.1 | I 20 | 0.035 | 30.0 | 15.5 | F |
|  | 9* | A 0.05 | I 20 | 0.035 | 45.0 | 20.0 | P |
| Reference 2 |  |  |  |  |  |  |  |
| Formulation | 1* | None | I 20 | 0.035 | 53.4 | 30.0 | P |
|  | 2* | None | III 20 | 0.030 | 61.2 | 48.5 | P |
|  | 3* | A' 2.0 | I 20 | 0.034 | 59.2 | 32.4 | P |
|  | 4* | A" 2.0 | I 20 | 0.035 | 60.0 | 30.5 | P |
|  | 5* | C' 2.0 | I 20 | 0.034 | 58.2 | 52.0 | P |
|  | 6* | D' 2.0 | I 20 | 0.034 | 59.1 | 30.2 | P |

*Not an example of the invention.

EXAMPLE 3

The same polyethylene resin as that used in Example 2 was mixed and kneaded with 0.3 percent of dicumyl peroxide as a crosslinking agent and 2.5 percent of behenic anhydride as an anti-shrinking agent to obtain a crosslinked polyethylene resin (in the form of beads with an average diameter of about 1.2 mm) having a gel ratio of about 60 percent. The beads were impregnated, in a pressure vessel with dichlorodifluoromethane under increased pressure and temperature and were then cooled to obtain expandable crosslinked polyethylene beads containing 14 percent of dichlorodifluoromethane. Such expandable beads were then heated and expanded by steaming with 0.23 kg/cm²G (22.6 kPa) steam for 45 sec. The resultant primary expanded beads had a substantially uniform density distribution of about 90 kg/cm³. Thereafter, the primary expanded beads were heated in a pressure vessel at 80° C. for 15 hours while being pressurized by compressed air of 10 kg/cm²G (981 kPa). Then, steam of 0.32 kg/cm²G (31.4 mm × 25 mm specimen of such article, by submerging such specimen in water (the top of the specimen being about 5 cm below the water's surface) contained in a vacuum chamber and by reducing the internal pressure of the chamber to 460 mm of mercury (absolute) and leaving the specimen to stand in the water for 10 minutes. Thereafter, the internal pressure of the chamber was restored to atmospheric and the specimen was removed therefrom and immersed in methanol having a purity of 95% or more for 2 seconds. After air drying, the thus treated specimen for 5 minutes at 60° C., its weight ($W_1$) was again accurately measured and the measurements $W_o$, $W_1$ and V were applied to the following formula:

$$\text{Water absorption ration (g/cm}^3) = \frac{W_1 - W_o}{V}$$

The water absorption value thus obtained provides and indication of the closed cellular characteristics of the foam specimen tested, with low water absorption ratios (i.e., relatively small amounts of water being absorbed by the sample) indicating a relatively closed cell character for (i.e., a relatively small proportion of open cells in) the foam sample tested.

In this particular example, the water absorption ratio of the indicated molded foam article was less than 0.01 gram/cm³.

REFERENCE 3

Except that the behenic anhydride additive was not used, the same procedure and conditions as those used in Example 3 were repeated to obtain primary and secondary expanded beads, which had densities of 110 kg/m³ and 30 kg/m³, respectively. These primary and secondary expanded beads exhibited substantial shrinkage and were replete with surface wrinkles, as compared with those obtained in Example 3.

In addition, the expandable beads of Reference 3, which were impregnated with the blowing agent, had a useful life of only 20 minutes which was significantly shorter than that observed in Example 3 (6 hours).

Further, the molded articles obtained in Reference 3 showed a higher water absorption ratio (0.015 gm/cm³) as compared with Example 3, and its shock-absorbing properties and mechanical properties were significantly inferior to those achieved in Example 3.

What is claimed is:

1. A foamable synthetic resin composition comprising a normally solid aliphatic olefin polymer, a volatile organic blowing agent and 0.1 to 10 percent by weight, based on said olefin polymer of at least one compound of the formula I:

$$R_1-X-R_2 \quad (I)$$

wherein $R_1$ and $R_2$ represent an aliphatic hydrocarbon group having 3 to 24 carbon atoms, respectively, with at least one thereof having 10 or more carbon atoms, and X represents a radical selected from the group consisting of

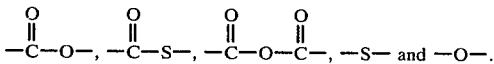

2. The foamable synthetic resin composition according to claim 1, wherein the aliphatic olefin polymer comprises polyethylene or a copolymer of a major proportion of ethylene with a minor proportion of one or more other monomers copolymerizable therewith.

3. The foamable synthetic resin composition of claim 1, wherein the compound of the formula (I) is selected from the group consisting of behenic anhydride, distearyl ether, distearyl thioether, stearyl laurate and stearyl thiolaurate.

4. The foamable synthetic resin composition of claim 1, wherein the aliphatic olefin polymer is a low density polyethylene resin or an ethylene-vinyl acetate copolymer.

5. A substantially closed-cell foam article composed predominantly of an aliphatic olefin polymer composition having incorporated therein from 0.1 to 10 weight percent based upon such olefin polymer of a compound of the formula I:

$$R_1-X-R_2 \quad (I)$$

wherein $R_1$ and $R_2$ represent an aliphatic hydrocarbon group having 3 to 24 carbon atoms, respectively, with at least one thereof having 10 or more carbon atoms, and X represents a radical selected from the group consisting of

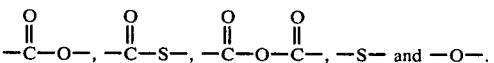

6. The foam article of claim 5, wherein the aliphatic olefin polymer is polyethylene or a copolymer of a major proportion of ethylene with a minor proportion of one or more other monomers copolymerizable therewith.

7. The foam article of claim 5, wherein the compound of the formula (I) is selected from the group consisting of behenic anhydride, distearyl ether, distearyl thioether, stearyl laurate and stearyl thiolaurate.

* * * * *